United States Patent [19]

Abeyta et al.

[11] Patent Number: 4,830,553
[45] Date of Patent: May 16, 1989

[54] COOLANT MANIFOLD ASSEMBLY

[75] Inventors: William J. Abeyta, Ventura; Leonard A. McConkie, Ojai, both of Calif.

[73] Assignee: Industrial Tools, Inc., Ojai, Calif.

[21] Appl. No.: 216,314

[22] Filed: Jul. 6, 1988

[51] Int. Cl.$^4$ .............. B23Q 11/10; B24B 55/02; B26D 7/08
[52] U.S. Cl. .............. 409/136; 51/262 A; 51/267; 83/168; 83/169; 408/56; 408/61
[58] Field of Search .......... 83/168, 169, 171; 51/262 A, 266, 267; 408/56, 61; 409/135, 136

[56] References Cited

U.S. PATENT DOCUMENTS

| | | | |
|---|---|---|---|
| 2,175,719 | 10/1939 | Long | 51/262 A |
| 2,319,140 | 5/1943 | Kottman et al. | 83/168 |
| 2,589,620 | 3/1952 | Leffel | 51/262 A |

FOREIGN PATENT DOCUMENTS 795918  1/1981  U.S.S.R. ............... 51/266

Primary Examiner—Steven C. Bishop
Attorney, Agent, or Firm—Kelly, Bauersfeld, & Lowry

[57] ABSTRACT

An improved coolant manifold assembly is provided for supplying liquid coolant to the working surface of a cutting or grinding wheel in the course of a machine tool cutting or grinding operation. The coolant manifold assembly is adjustably mounted by a support frame onto a machine housing and includes a manifold unit having a coolant discharge nozzle disposed in relatively close association with a rotatable cutting wheel or wheels or the like. The manifold unit is supported from the frame by a first slide member which is adjustable to select the position of the discharge nozzle relative to the cutting wheel. In addition, the manifold unit supports an absorbent pad wetted with coolant and protruding into direct contact with the cutting wheel at a position generally adjacent the coolant discharge nozzle. A second slide member carries the absorbent pad for adjustment of pad position relative to the coolant discharge nozzle.

21 Claims, 4 Drawing Sheets

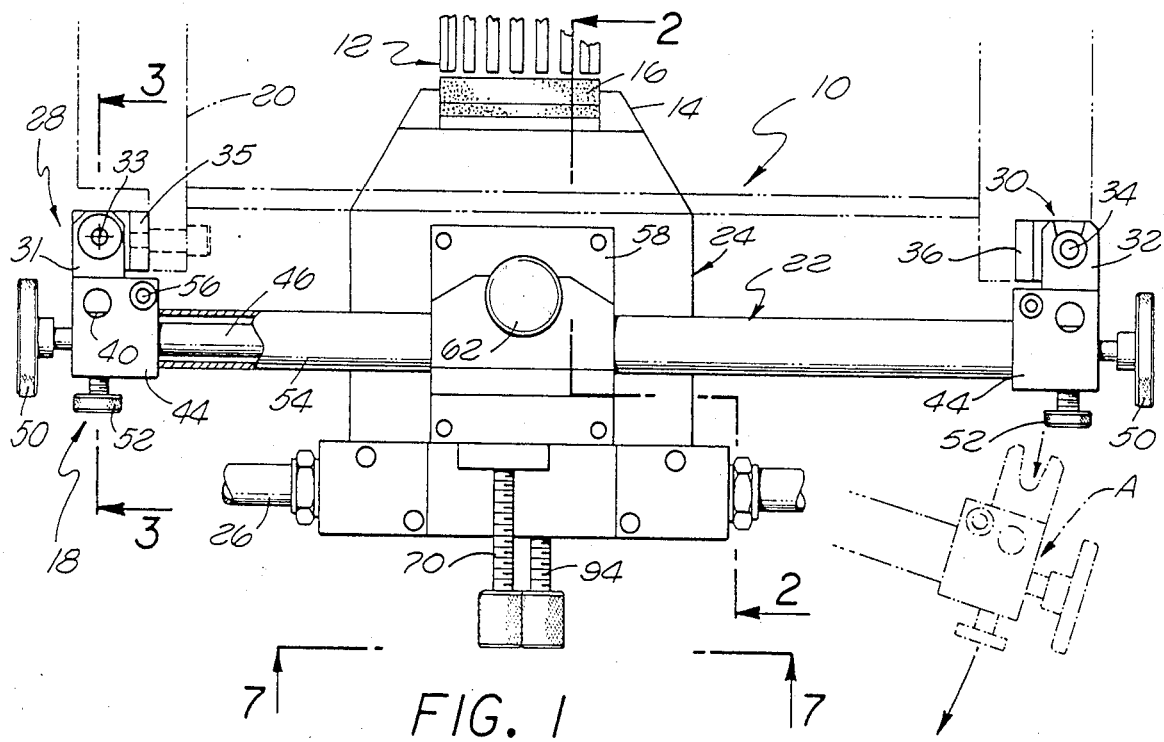
FIG. 1
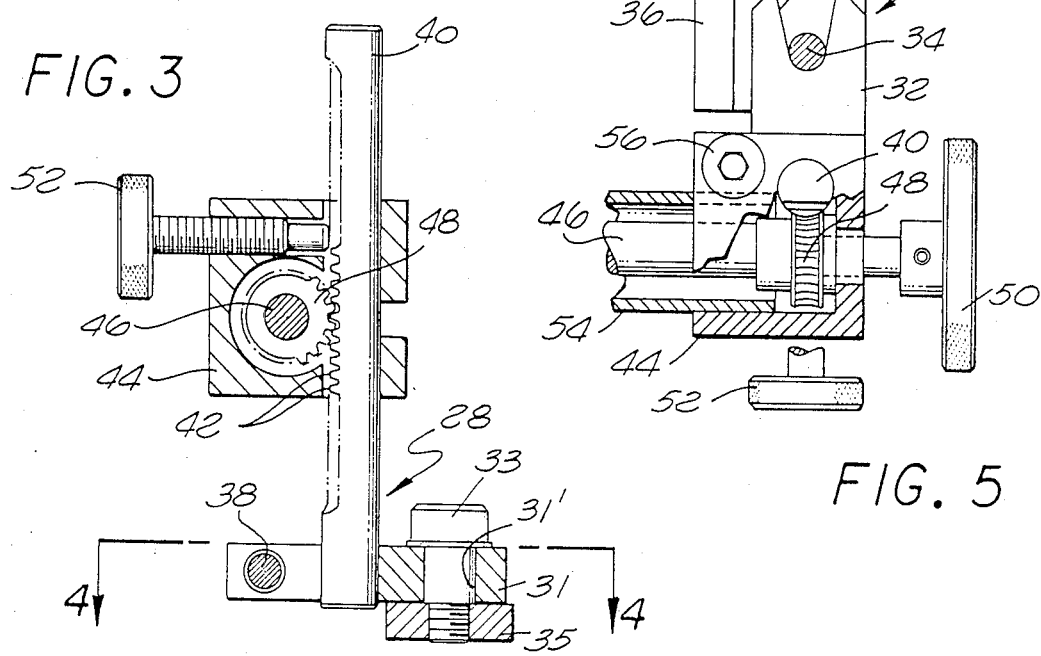
FIG. 3
FIG. 5
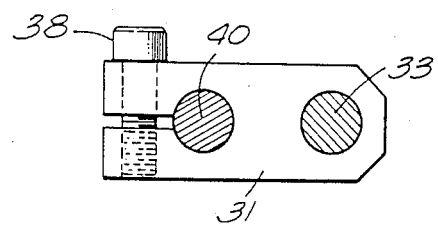
FIG. 4

COOLANT MANIFOLD ASSEMBLY

BACKGROUND OF THE INVENTION

This invention relates generally to devices and systems for supplying a flow of liquid coolant to the working surface of a cutting or grinding tool in the course of a machine tool operation. More particularly, this invention relates to an improved coolant manifold assembly having versatile adjustment capabilities to achieve improved coolant flow to the working surface of the cutting or grinding tool, and thereby achieve improved overall tool operation.

Cutting and grinding wheels are used in a wide variety of industrial machine tool operations in the course of manufacturing many different types of products. In a typical operation, the cutting or grinding wheel is suported from a machine housing and is rotatably driven to perform a desired cutting or grinding operation upon a selected workpiece. In some operations, a plurality of cutting or grinding wheels are ganged together for rotation as a unit to perform a desired cutting or grinding operation relative to one or more workpieces. As one example of such machine tool operations, a gang of relatively narrow cutting wheels are commonly used for precision cutting of ceramic based materials in the production of read/write heads for compute disk drive units or the like. In such cutting operations, the cutting wheels are typically rotated at a relatively high speed on the order of eight to ten thousand rpm.

In industrial cutting tool operations, a liquid coolant is commonly supplied at a controlled flow rate onto the working surface of a rotating cutting or grinding wheel. The liquid coolant typically comprises a water-based solution of selected polymers, wetting agents, and/or other components intended to improve the cutting or grinding operation. More specifically, the coolant is designed to carry thermal energy away from the cutting tool, together with grit or debris which may be present on the working surface as a result of the cutting or grinding operation. These functions advantageously result in a cleaner tool working surface, thereby reducing tool wear and improving the quality of workpiece surface finish.

In the past, devices for supplying coolant flow to a cutting tool working surface have generally comprised relatively simple nozzle arrangements through which a regulated coolant stream is projected toward the cutting or grinding tool. However, such nozzle arrangments have not adequately accounted for air film boundary layers which can occur particularly with cutting or grinding wheels rotated at relatively high speeds. The presence of an air film boundary layer can prevent thorough or intimate coolant contact with the tool working surface, resulting in inadequate dispersal of heat, grit, and debris. Relatively soft pads or flaps have been proposed to ride against the cutting tool working surface in efforts to disrupt the air film boundary layer, but these approaches have not satisfactorily accommodated tool wear and/or wear of the pad or flaps, wherein such wear spaces the pad or flaps from the tool working surface to permit reoccurence of the undesired air film boundary layer.

There exists, therefore, a significant need for an improved coolant manifold arrangement for effectively supplying a coolant flow into direct contact with the working surface of a machine tool, particularly such as a rotatable cutting or grinding wheel or the like. The present invention fulfills this need and provides further related advantages.

SUMMARY OF THE INVENTION

In accordance with the invention, an improved coolant manifold assembly is provided for use in supplying a flow of coolant into direct contact with the working surface of a cutting tool, such as a cutting or grinding wheel or the like. The manifold assembly comprises a support frame adapted to carry a manifold unit on a machine housing or the like in an adjustably selected position with respect to a machine cutting or grinding tool. The manifold unit is coupled to a supply of coolant and includes appropriate manifold passages for discharging the coolant through a discharge nozzle into direct contact with the tool working surface. An absorbent pad is wetted with the coolant and protrudes from the manifold unit into contact with the tool working surface, wherein the pad disrupts any air film boundary layer which might otherwise interfere with coolant contact with the tool. Independent adjustment means are provided for displacing the discharge nozzle relative to the tool working surface, and for displacing the absorbent pad relative to the discharge nozzle.

In accordance with one preferred form of the invention, the manifold unit is suspended from the support frame in a position generally adjacent to the working surface of a cutting or grinding wheel, or gang of wheels. The manifold unit includes an upper or first slide plate received into a slide track of a bearing block carried by the support frame. This first slide plate in turn carries the assembled components of the manifold unit which are coupled to the supply of liquid coolant and define internal passage means leading to a discharge nozzle for directing a coolant flow toward the adjacent cutting or grinding tool. An upper or first adjustment member such as an adjustment screw interacts between the bearing block and the first slide plate for displacing the entire manifold unit along the slide track in a direction toward or away from the adjacent cutting tool. Accordingly, the spacing between the discharge nozzle and the tool working surface can be closely regulated to control coolant discharge flow into contact with the tool working surface.

The manifold unit defines a second slide track which receives a lower or second slide plate for adjustable displacement in a direction toward or away from the tool working surface. The second slide plate carries the absorbent pad in flow communication with the internal manifold passages, whereby the pad is wetted with coolant supplied to the manifold unit. A leading edge of the absorbent pad protrudes from the manifold unit for contact with the tool working surface at a position generally closely adjacent to the discharge nozzle. A lower or second adjustment member such as a second adjustment screw interacts between the manifold unit and the second slide plate for adjustably positioning the pad independently of the discharge nozzle.

In accordance with further preferred aspects of the invention, the support frame comprises an elongated support bar member extending generally transversly across the machine housing, when said support frame is mounted onto the machine housing. The bearing block includes a clamp member adapted to secure the bearing block in a selected position along the length of the support bar member, and in a selected rotational position relative to a central axis of the support bar member. In addition, the support frame includes means for vertically adjusting the support bar member relative to the machine housing, as well as means for swinging the support bar member to an out-of-the-way position, when desired.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a top plan view illustrating a coolant manifold assembly embodying the novel features of the invention, and depicted generally in operative association with a gang of cutting wheels in a machine tool operation;

FIG. 3 is an enlarged vertical sectional view taken generally on the line 3—3 of FIG. 1;

FIG. 4 is a horizontal plan view taken generally on the line 4—4 of FIG. 3;

FIG. 5 is an enlarged fragmented plan view of a portion of the manifold assembly depicted in FIG. 1, with selected portions thereof broken away to illustrate construction details;

DETAILED DESCRIPTION OF THE PREFERRED EMBODIMENT

Figure 2:
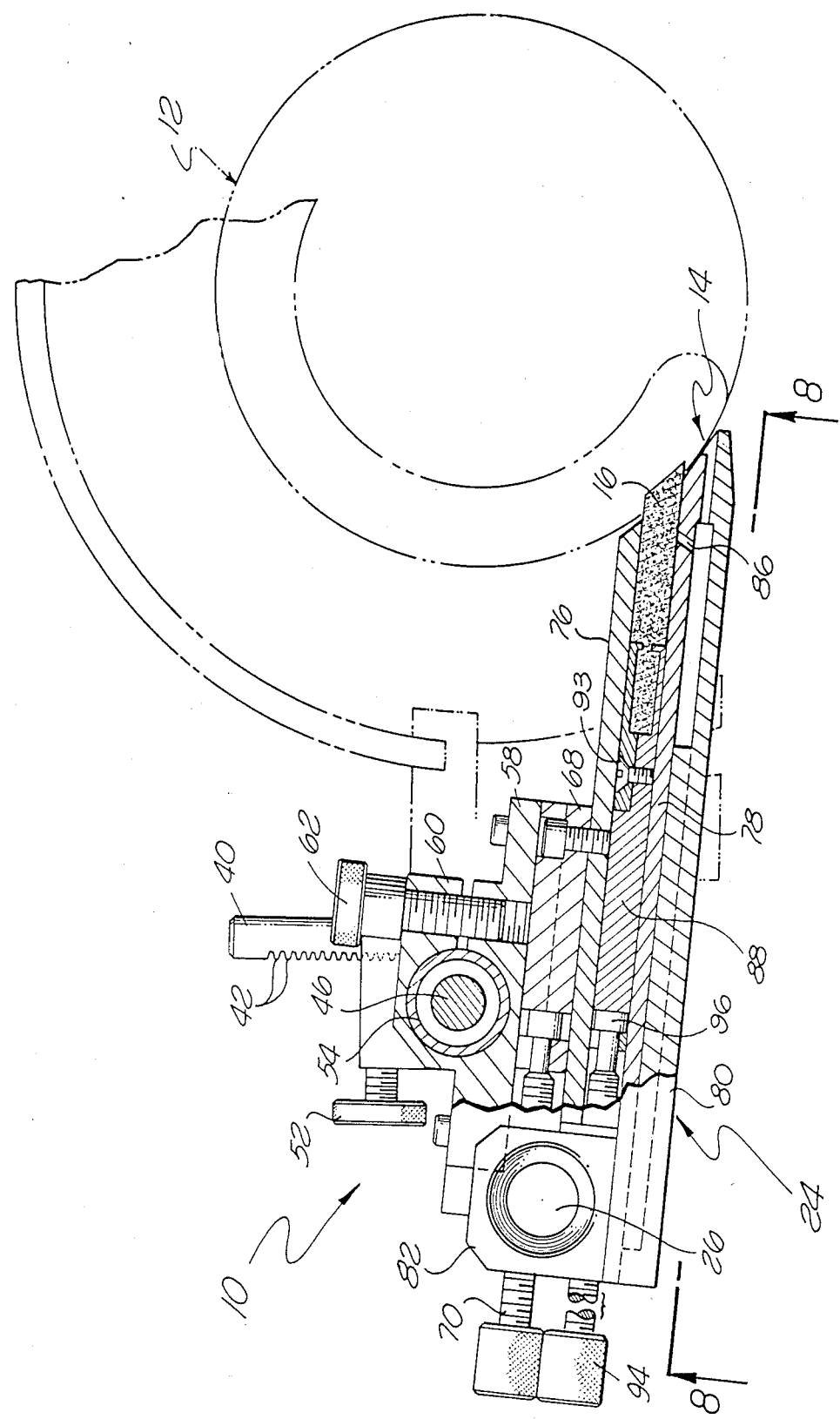
FIG. 2 is an enlarged vertical sectional view taken generally on the line of 2—2 of FIG. 1.

As shown in the exemplary drawings, an improved coolant manifold assembly referred to generally by the reference numeral 10 is provided for supplying a flow of coolant into direct contact with a cutting tool, such as one or more rotatable cutting or grinding wheels 12 as shown in FIGS. 1 and 2. The coolant manifold assembly 10 includes a discharge nozzle 14 for supplying the coolant flow to the cutting wheel or wheels 12, in combination with an overlying absorbent pad 16. The manifold assembly 10 is designed for variable and independent adjustment of the discharge nozzle 14 and the absorbent pad 16 to insure optimum flow of coolant to the working surface of the machine tool, for purposes of reducing tool wear and improving resultant surface finish and/or precision geometry of a workpiece (not shown).

The improved coolant manifold assembly 10 of the present invention is adapted for use with a wide variety of machine tools such as cutting wheels and grinding wheels and the like utilized in many industrial processes. For example, in one preferred application as depicted generally in the accompanying drawings, the manifold assembly 10 is useful in supplying a flow of liquid coolant of selected composition into direct and intimate contact with the cutting surfaces or edges of a gang of cutting wheels 12 (FIG. 1), wherein such cutting wheels are rotated typcially at a relatively high speed of several thousand rpm and in unison for performing selected cutting steps with respect to one or more associated workpieces. Such workpieces might include, by way of example, ceramic-based materials which are appropriately cut and trimmed to form read/-write heads utilized in computer disk drive units and the like. The discharge nozzle 14 and the absorbent pad 16 cooperate to supply the coolant to the working surfaces of the cutting wheels to prevent thermal build-up and to wash away grit and debris which are normally present incident to cutting or grinding processes. The independent adjustment capability provided by the invention permits the absorbent pad 16 to be positionally adjusted relative to the cuttng wheels 12 and independently of the nozzle 14, thereby permitting the pad 16 to be positioned for disrupting any air surface film boundary layer which might otherwise be present on the rapidly rotated cutting wheels.

As shown generally in FIGS. 1 and 2, the coolant manifold assembly 10 comprises a support frame 18 adapted for mounting onto the housing 20 or the like of a machine which rotatably supports the illustrative cutting wheels 12. The support frame 18 includes an elongated support bar member 22 positioned to extend transversely across a portion of the machine housing 20. A manifold unit 24 is mounted along the length of the support bar member 22, wherein this manifold unit 24 includes the discharge nozzle 14 and absorbent pad 16 disposed adjacent to the cutting wheels 12 of the machine. A flow of liquid coolant of selected composition is coupled to the manifold unit 24 via hoses 26 for supply in turn to the discharge nozzle 14 and absorbent pad 16, as will be described.

The support bar member 22 is mounted onto the machine housing 20 by means of left and right adjustable support units 28 and 30, as viewed in FIGS. 1–5. More specifically, each of these support units 28 and 30 includes a lower support plate 31 and 32, respectively fastened by associated bolts 33 and 34 to a corresponding pair of horizontally oriented mounting brackets 35 and 36 on the machine housing 20. At the left support unit 28, the associated plate 31 includes an unthreaded circular bor 31' for passage of the mounting bolt 33 (FIG. 3), whereas the opposite mounting bolt 34 is fastened through a laterally open slot 32' (FIG. 5) in the associated plate 32. With this construction, upon loosening of the mounting bolt 34 at the right support unit 30 (FIGS. 1 and 5) the entire support frame 18 and the manifold unit 24 carried thereby can be pivoted outwardly from the machine housing about the axis of the mounting bolt 33 toward an out-of-the-way position facilitating access to the cutting wheels 12 and/or any workpiece support structures (not shown) associated therewith. This pivoting of the support frame 18 to an out-of-the-way position is depicted by dotted lines "A" in FIG. 1.

The support plates 31 and 32 of the adjustable support units 28 and 30 include clamp portions locked by screws 38 onto a respective pair of upstanding rack posts 40, as shown in FIGS. 3 and 4 with respect to the left support unit 28. The rack posts 40 each include a vertically enlonged array of gear teeth 42 which extend along the post through an associated spindle support block 44. The two spindle support blocks 44 or the left and right support units 28 and 30 carry the opposite ends of the support bar member 22 for vertical adjustment with respect to the machine housing 20.

The preferred construction for the support bar member 22 includes an elongated shaft 46 having a pair of spindle gears 48 near the opposite ends thereof in meshed engagement with the took sets 42 of the rack posts 40. The shaft 46 projects beyond the spindle gears 48 to the outboard sides of the spindle support blocks 44 for suitable connection to adjustment dials 50 which may be grasped manually and appropriately rotated to displace the shaft 46 up or down with respect to the rack posts 40. Locking screws 52 are desirably carried within appropriate threaded bores within the spindle support blocks 44 for binding engagement with the rack posts 40 to lock the spindle support blocks 44 against vertical adjustment, when an appropriate position of vertical adjustment has been reached. Vertical adjustment to a selected position is obtained by rotating the outboard dials 50 to translate the shaft 46 up or down along the rack posts 40, relative to the machine housing.

The support bar member 22 further includes an elongated cylindrical outer support tube or sleeve 54 positioned about the elongated shaft 46. The opposite ends of the support sleeve 54 are seated within appropriate counterbored seats formed in the spindle support blocks 44. Clamp screws 56 are fastened into the spindle support blocks 44 for releasably locking the spindle support blocks onto the sleeve, thereby preventing relative rotation between the spindle support blocks 44 and the support sleeve 54.

The manifold unit 24 is carried by the support sleeve 54 in a selected position for general alignment with the cutting wheels 12. More specifically, as shown best in FIGS. 2 and 6, a bearing block 58 includes an upper clamp member 60 defining an upper bore 61 for passage of the support sleeve 54. A clamp screw 62 is fastened through one side of the clamp member 60 for securely locking the bearing block 58 onto the support sleeve 54. Importantly, this clamping construction accommodates mounting of the bearing block 58 at a selected longitudinal position along the length of the support sleeve 54 and at a selected rotational orientation about a central axis of the support sleeve 54. Accordingly, the support frame 18 including the support bar member 22 and the bearing block 58 are adapted to permit multiple positional adjustments of the manifold unit 24 with respect to the associated machine.

The bearing block 58 supports the manifold unit 24 and defines a slide track to accommodate manifold displacement along an axis extending generally toward and away from the adjacent cutting wheels 12. More particularly, as shown best in FIG. 6, the underside of the bearing block 58 is recessed to form a central channel 64 bounded on laterally opposite sides by a pair of relatively short, downwardly projecting wall portions 64'. These wall portions are fastened by screws 65 to underlying track rails 66. Importantly, the track rails 66 have inner edges 66' spaced inboard with respect to the associated wall portions 64', such that the track rail edges 66' underlie portions of the channel 64. An upper or first slide plate 68 is received into the channel 64 and includes appropriate side margins 68' which are locked within the channel 64 by the track rails 66. Accordingly, the slide plate 68 is carried by the bearing block 58 and its associated track rails 66 for sliding displacement in a direction toward or away from the adjacent cutting wheels 12. This sliding displacement is obtained in a controlled manner by means of an upper adjustment screw 70 having a foot 71 seated within a generally T-shaped pocket 72 formed in an upper face of the slide plate 68. A threaded shank of the screw extends rearwardly from the pocket 72 through a threaded bore 73 formed in a support block 74 fastened by screws 75 or the like onto a rear margin of the bearing block 58. Appropriate advancement or retraction of the adjustment screw 70 within the thread bore 73 effectively advances or retracts the slide plate 68 with respect to the bearing block.

The remaining components of the manifold unit 24 are carried by the slide plate 68. Accordingly, rotation of the adjustment screw 70 effectively displaces the entire manifold unit as an integrated component along an axis defined by the channel 64 in the bearing block 58. Such movement, as will be described in more detail, displaces the discharge nozzle 14 and the absorbent pad 16 together along an axis toward and away from the adjacent cutting wheels 12.

Figure 6:
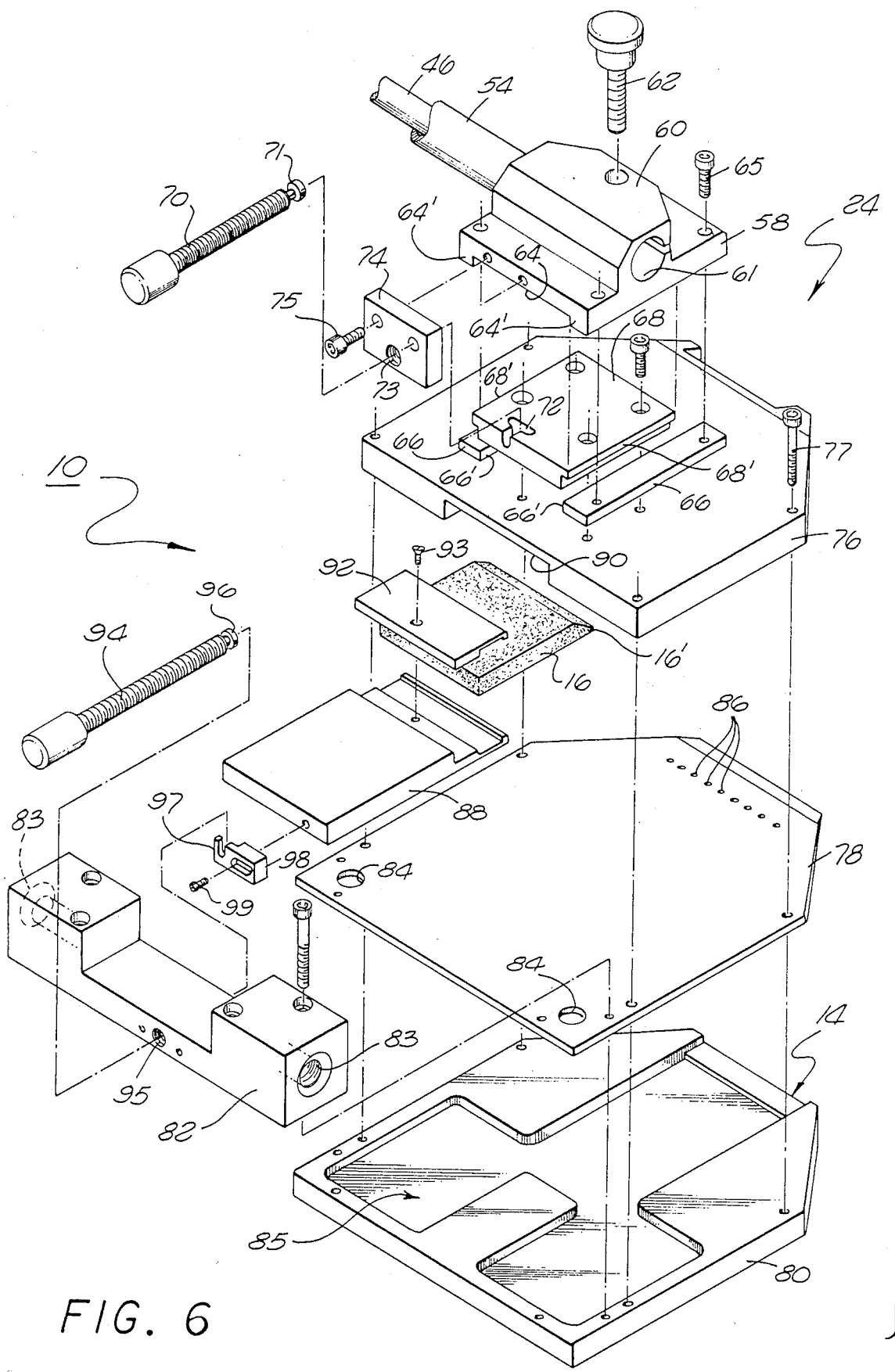
FIG. 6 is an enlarged exploded perspective view illustrating assembly of a manifold unit forming an integral portion of the coolant manifold assembly.
Figure 7:
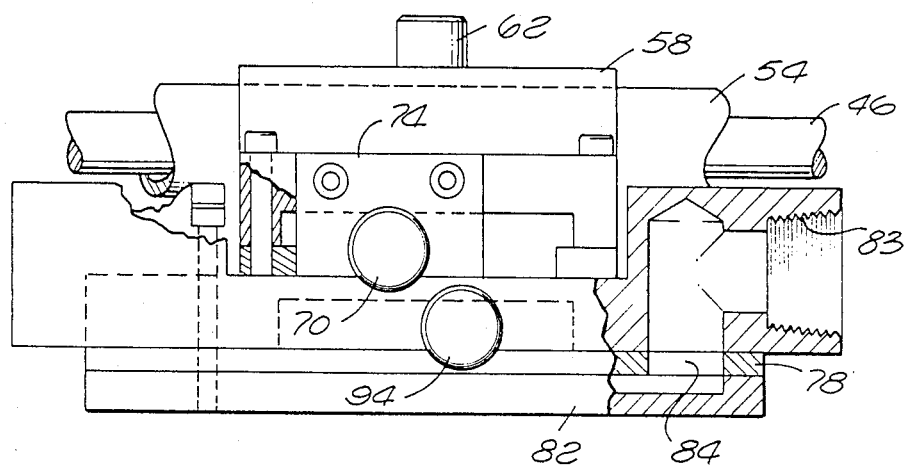
FIG. 7 is a fragmented front elevation view of a portion of the coolant manifold assembly as viewed generally on the line 7—7 of FIG. 1, with portions broken away to show construction details of the assembled manifold unit.
Figure 8:
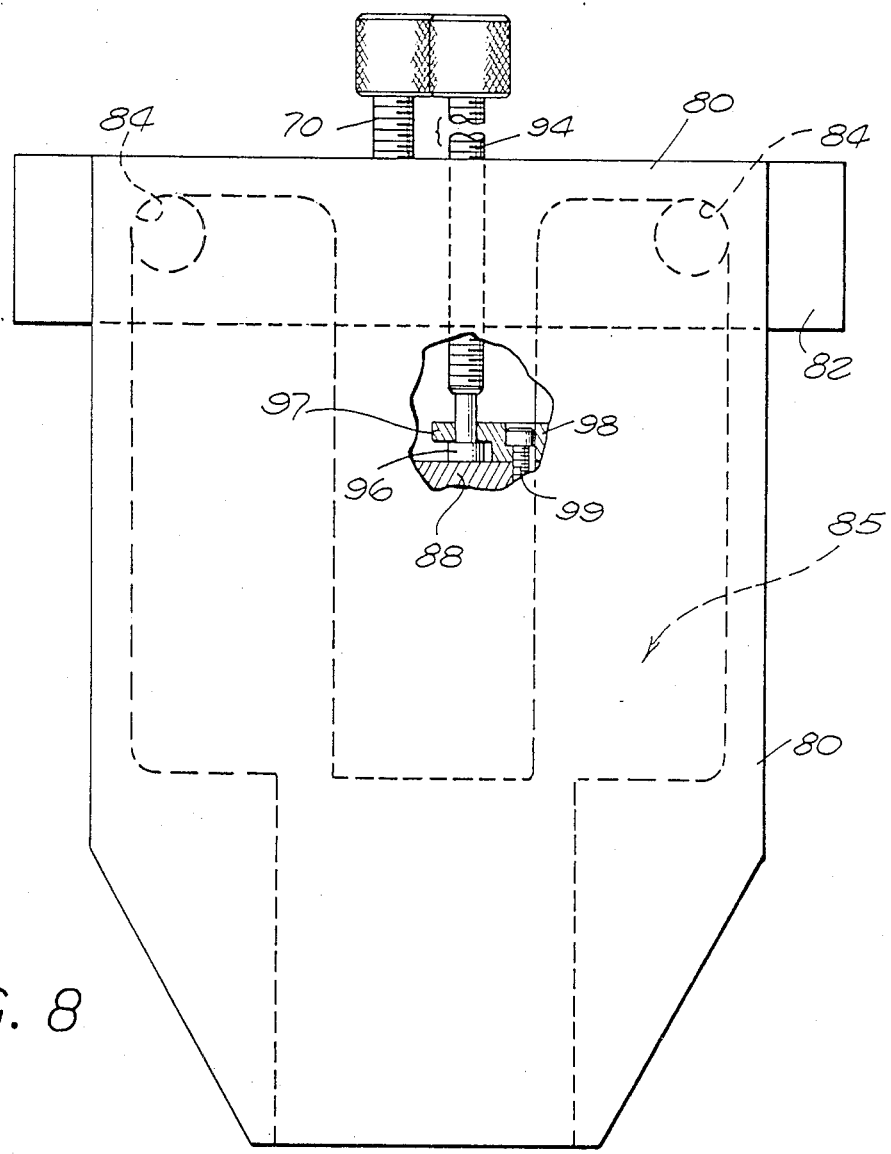
FIG. 8 is a bottom plan view of the manifold unit, taken generally on the line 8—8 of FIG. 2.

As shown best in FIG. 6, the remaining components of the manifold unit 24 include an upper head plate 76 mounted over a manifold cover plate 78 which is mounted in turn onto a manifold base plate 80. Appropriate screws 77 or the like are provided for securely connecting these plate components together. The rear margins of the manifold cover and base plates 78 and 80 protrude rearwardly beyond the head plate 76 to accommodate mounting thereonto of a coolant manifold block 82. As shown in FIGS. 1, 2, 6 and 7, the manifold block 82 defines an oppositely opening pair of coolant-receiving inlets 83 for appropriate attachment to the pair of coolant supply hoses 26. The coolant inlets 83 open downwardly (FIG. 7) through aligned ports 84 in the manifold cover plate 78 to permit coolant flow into a recessed chamber 85 defined by the manifold base plate 80. Since the top of the chamber 85 is essentially and substantially closed by the manifold cover plate 78, the coolant flow passes through the chamber 85 toward an open forward end comprising the dicharge nozzle 14. As shown in the illustrative drawings for use with a plurality or gang of cutting wheels 12, this nozzle 14 has an extended length to accommodate simultaneous coolant supply to all of the associated cutting wheels.

The absorbent pad 16 is mounted above the manifold cover plate 80 in a position directly above the discharge nozzle 14. In this regard, the absorbent pad 16 comprises appropriate lightweight fibrous material or the like which is continuously wetted with coolant by means of coolant flow through a plurality of relatively small apertures 86 formed in the cover plate 78 near the discharge nozzle 14. In the preferred form, these apertures 86 are arranged in a row to extend substantially the width of the pad 16 and the underlying nozzle 14, thereby accommodating substantially uniform wetting of the pad during operation.

A lower or second slide plate 88 is mounted on the manifold cover plate 78 and supports the absorbent pad 16 for sliding adjustment relative adjustment to the nozzle 14. In this manner, a leading edge 16' of the absorbent pad can be positioned to protrude a selected distance from the manifold unit for directly contacting the working surfaces or edges of the cutting wheel 12, as depicted in FIG. 2.

The lower slide plate 88 has a generally rectangular shape sized for sliding reception within an elonated central channel 90 formed in a lower face of the head plate 76. Importantly, this channel 90 is oriented generally in parallel with the central channel 64 associated with the bearing block 58. A forward margin of the slide plate 88 is reduced in height to define a support member adapted to receive and support a rear edge of the absorbent pad 16. A clamp cap 92 is fastened by a screw 93 or the like onto this forward portion of the slide plate 88 to securely lock the pad 16 in place.

A lower or second adjustment screw 94 has a threaded shank received through a threaded bore 95 formed in the manifold block 82. The leading end of this adjustment screw 94 defines a foot 96 adapted to seat in front of a laterally projecting wing 97 on an adjustment key 98 which is secured in turn by a screw 99 or the like onto a rear edge of the slide plate 88. Accordingly, similar to the upper adjustment screw 70, rotation of the lower adjustment screw 94 effectively pushes or pulls on the lower slide plate 88 to adjust the position of the pad 16 relative to the underlying nozzle 14.

In operation, with the manifold unit 24 appropriately positioned with respect to the support bar member 22, the upper adjustment screw 70 is appropriately rotated to position the nozzle 14 in desired close proximity to the adjacent cutting wheels 12. When the nozzle is seated as desired, the lower adjustment screw 94 is rotated to advance or retract the leading edge of the pad 16 to the desired position. In the preferred position, the pad 16 wipes grit and other debris from the cutting wheel by direct contact therewith, and in a manner disrupting any air film boundary effect which might otherwise be present. The discharge nozzle 14 disposed immediately below the pad 16 supplies coolant flow into direct contact with the cutting wheel working surfaces or edges, while simultaneously wetting the pad 16. As the cutting wheels wear in the course of normal operation, the pad 16 can be adjusted independently from the nozzle 14 to insure maintenance of direct wheel contact therewith. Alternately, as required, the discharge nozzle 14 can be adjusted with respect to the wheels.

The coolant manifold assembly of the present invention thus provides an improved yet relatively simple and easily adjusted manifold apparatus for insuring optimum coolant supply to working surfaces of cutting tools.

A variety of modifications and improvements to the improved coolant manifold assembly will be apparent to those skilled in the art. Accordingly, no limitation on the invention is intended by way of the foregoing description or accompanying drawings, except as set forth in the appended claims.

What is claimed is:

1. A coolant manifold assembly for mounting onto a machine and for supplying coolant to the working surface of a machine tool, said manifold assembly comprising:
    a manifold unit;
    frame means for mounting said manifold unit onto the machine; and
    coolant supply means for supplying coolant to said manifold unit;
    said manifold unit including a discharge nozzle for discharging a first portion of the coolant in a direction generally toward the machine tool when said manifold unit is mounted onto the machine, an absorbent pad supported by said manifold unit in a position with a leading edge of said pad protruding from said manifold unit, means for wetting said pad with a second portion of the coolant, first adjustment means for adjusting the position of said discharge nozzle, and second adjustment means for adjusting the position of said pad independently of said discharge nozzle.

2. The coolant manifold assembly of claim 1 wherein the coolant comprises a liquid coolant.

3. The coolant manifold assembly of claim 1 wherein said leading edge of said absorbent pad is disposed generally adjacent said discharge nozzle.

4. The coolant manifold assembly of claim 3 wherein said manifold unit defines an internal coolant flow passage communicating between said coolant supply means and said discharge nozzle, said wetting means comprises means defining at least one aperture permitting coolant flow from said flow passage to said pad.

5. The coolant manifold assembly of claim 1 wherein said first adjustment means includes means for adjusting the position of said discharge nozzle along a first direction generally toward and away from the machine tool when said manifold unit is mounted onto the machine, said second adjustment means including means for adjusting the position of said pad along said first direction independently of the position of said discharge nozzle.

6. The coolant manifold assembly of claim 5 wherein said first adjustment means includes means for displacing said pad and said discharge nozzle in unison along said first direction.

7. The coolant manifold assembly of claim 5 wherein said frame means includes a first slide track, and wherein said first adjustment means comprises a first slide member carrying said manifold unit and slidable along said first slide track generally in said first direction, said first adjustment means further including a first adjustment member cooperatively engaging said frame means and said first slide member and movable for displacing said first slide member along said first slide track.

8. The coolant manifold assembly of claim 7 wherein said second adjustment means comprises a second slide track defined by said manifold unit, a second slide member carrying said absorbent pad and slidable along said second slide track generally in said first direction, and a second adjustment member cooperatively engaging said manifold unit and said second slide member and movable for displacing said second slide member along said second slide track.

9. The coolant manifold assembly of claim 8 wherein said first and second adjustment members respectively comprise first and second adjustment screws.

10. the coolant manifold assembly of claim 1 wherein said frame means comprises an elongated support bar member, means for mounting said support bar member to extend along the machine in a position generally adjacent the machine tool, a bearing block slidably mounted along said support bar member, means for mounting said manifold unit to said bearing block, and means for releasably securing said bearing block in a selected position along the length of and a selected rotational orientation about said support bar member.

11. The coolant manifold assembly of claim 10 further including means for adjusting the position of said support bar member relative to the machine when said support bar member is mounted with respect to the machine.

12. The coolant manifold assembly of claim 1 wherein said frame means includes means for permitting swinging movement of said manifold unit to a out-of-the-way position.

13. A coolant manifold assembly for supplying coolant to the working surface of a machine tool, said coolant manifold assembly comprising:

coolant supply means including a discharge nozzle for discharging coolant;

first means for mounting said coolant supply means with respect to the machine tool in a position such that said nozzle discharges coolant substantially into direct contact with the working surface of the machine tool, said first mounting means including first adjustment means for variably adjusting the position of said discharge nozzle relative to the machine tool;

an absorbent pad;

second means for mounting said pad with respect to the machine tool in a position such that said pad defines a pad surface presented generally toward the machine tool, said second mounting means including second adjustment means for variably adjusting the position of said pad independently of the position of said discharge nozzle such that said pad surface substantially directly contacts the machine tool at a position closely adjacent to said discharge nozzle; and means for wetting said pad with a portion of the coolant supplied by said coolant supply means.

14. The coolant manifold assembly of claim 13 wherein said first and second mounting means comprise a manifold unit.

15. The coolant manifold assembly of claim 13 wherein said first adjustment means includes means for adjusting the position of said discharge nozzle along a first direction generally toward and away from the machine tool, and wherein said second adjustment means includes means for adjusting the position of said pad along said first direction independently of the position of said discharge nozzle.

16. The coolant manifold assembly of claim 15 wherein said first adjustment means includes means for displacing said pad and said discharge nozzle in unison along said first direction.

17. A coolant manifold asembly for use in combination with a machine having a machine tool, said coolant manifold assembly comprising:

a frame mounted onto said machine;

a manifold unit having a coolant discharge nozzle;

first means for mounting said manifold unit on said frame in one of a plurality of selected positions to orient said discharge nozzle in a position generally adjacent said machine tool;

said first means including first adjustment means for variably positioning said manifold unit relative to said frame to displace said discharge nozzle along a first direction generally toward and away from said machine tool;

coolant supply means for supplying coolant to said manifold unit, said manifold unit having an internal flow passage for communicating the coolant to said discharge nozzle;

an absorbent pad; and second means for mounting said pad on said manifold unit in a position with a pad surface presented generally toward the machine tool for contacting the machine tool at a position closely adjacent to said discharge nozzle, said manifold unit including means for wetting said pad with a portion of the coolant;

said second means including second adjustment means to displace said pad along said first direction independently of said discharge nozzle.

18. The combination of claim 17 wherein said first adjustment means includes means for displacing said pad and said discharge nozzle in unison along said first direction.

19. The combination of claim 17 wherein said frame includes a first slide track, and wherein said first adjustment means comprises a first slide member carrying said manifold unit and slidable along said first slide track generally in said first direction, said first adjustment means further including a first adjustment member cooperatively engaging said frame and said first slide member and movable for displacing said first slide member along said first slide track, and wherein said second adjustment means comprises a second slide track defined by said manifold unit, a second slide member carrying said absorbent pad and slidable along said second slide track generally in said first direction, and a second adjustment member cooperatively engaging said manifold unit and said second slide member and movable for displacing said second slide member along said second slide track.

20. The combination of claim 17 wherein said frame comprises an elongated support bar member, means for mounting said support bar member to extend along the machine in a position generally adjacent the machine tool, a bearing block slidably mounted along said support bar member, means for mounting said manifold unit to said bearing block, and means for releasably securing said bearing block in a selected position along the length of a selected rotational orientation about said support bar member.

21. The combination of claim 20 further including means for adjusting the position of said support bar member relative to the machine when said support bar member is mounted with respect to the machine.

* * * * *